(12) United States Patent
Wang et al.

(10) Patent No.: US 9,623,760 B2
(45) Date of Patent: Apr. 18, 2017

(54) SYSTEM AND METHOD FOR MANAGING UNMANNED AERIAL VEHICLES

(71) Applicant: SZ DJI TECHNOLOGY CO., LTD., Shenzhen, Guangdong (CN)

(72) Inventors: Mingxi Wang, Guangdong (CN); Xiangyu Chen, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/747,989

(22) Filed: Jun. 23, 2015

(65) Prior Publication Data
US 2016/0144734 A1 May 26, 2016

Related U.S. Application Data

(63) Continuation of application No. PCT/CN2014/091939, filed on Nov. 21, 2014.

(51) Int. Cl.
*B60L 11/18* (2006.01)
*B64C 29/00* (2006.01)
*B64D 45/04* (2006.01)
*B64C 39/02* (2006.01)

(52) U.S. Cl.
CPC ...... *B60L 11/1822* (2013.01); *B64C 29/0016* (2013.01); *B64C 39/024* (2013.01); *B64D 45/04* (2013.01); *B64C 2201/027* (2013.01); *B64C 2201/042* (2013.01); *B64C 2201/066* (2013.01)

(58) Field of Classification Search
CPC ............. B60L 11/1822; Y10T 29/4973; Y10T 29/53961; Y02T 10/7005; Y02T 10/7072; Y02T 90/14; Y02T 90/124
See application file for complete search history.

(56) References Cited

U.S. PATENT DOCUMENTS

| 5,936,184 A | * | 8/1999 | Majerus et al. | ............... 89/1.13 |
| 2003/0208302 A1 | * | 11/2003 | Lemelson | ............. G05B 19/19 |
| | | | | 700/245 |
| 2013/0081245 A1 | | 4/2013 | Vavrina et al. | |
| 2014/0129059 A1 | * | 5/2014 | Scarlatti et al. | ............... 701/16 |

(Continued)

FOREIGN PATENT DOCUMENTS

| CN | 102909540 A | 2/2013 |
| CN | 202922160 U | 5/2013 |

(Continued)

OTHER PUBLICATIONS

International Search Report, PCT/CN2014/091939, Mar. 20, 2015.

*Primary Examiner* — Rodney Butler
(74) *Attorney, Agent, or Firm* — Anova Law Group, PLLC

(57) ABSTRACT

A base station for automated battery pack or payload exchange and methods for using the same. The base station provides a landing surface for receiving a mobile platform and includes a manipulator controlled by a manipulator compartment for accessing resource storage. The base station is operable to ascertain a location of the mobile platform on the landing surface and move the manipulator to the mobile platform. Thereby, the base station system advantageously accommodates low-accuracy landing of the mobile platform and further enables extended and autonomous operation of the mobile platform without the need for user intervention for exchanging battery packs and payloads.

29 Claims, 12 Drawing Sheets

(56) References Cited

U.S. PATENT DOCUMENTS

| | | | | |
|---|---|---|---|---|
| 2014/0319272 A1* | 10/2014 | Casado Magana | ....... | B64F 1/04 244/110 E |
| 2015/0134274 A1* | 5/2015 | Froom | .................. | B64F 5/0045 702/39 |
| 2015/0344136 A1* | 12/2015 | Dahlstrom | ............ | B64C 39/024 701/3 |
| 2016/0039541 A1* | 2/2016 | Beardsley | ........... | B60L 11/1816 701/2 |

FOREIGN PATENT DOCUMENTS

| | | | | |
|---|---|---|---|---|
| CN | 203845022 U | 9/2014 | | |
| EP | 2 799 336 A1 | 11/2015 | | |
| JP | H0727512 A | * 1/1995 | | |
| JP | 3044978 B2 | * 5/2000 | .............. | B64F 1/002 |

\* cited by examiner

SYSTEM AND METHOD FOR MANAGING UNMANNED AERIAL VEHICLES

CROSS-REFERENCE TO RELATED APPLICATIONS

This application is a continuation of, and claims priority to, copending PCT Patent Application Number PCT/CN2014/091939, which was filed Nov. 21, 2014. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates generally to mobile platforms and more specifically, but not exclusively, to base stations for servicing mobile platforms, such as unmanned aerial vehicles (UAVs).

BACKGROUND

Conventional unmanned aerial vehicles (UAVs) have limited flight time because their battery life is often limited to ten to thirty minutes at the most. When a battery is expended, the UAV must land, and the expended battery must be exchanged by a user or recharged before the UAV can operate again. Similarly, each UAV may carry a payload configured to perform a specific function such as capturing images of the operating environment, spreading pesticides, or transporting fuel. For each of these payloads, regular maintenance is required that typically involves frequent user interaction (e.g., users required to download captured images or refill a pesticide spray tank).

The necessity for frequent user interaction to maintain and exchange the batteries and payloads of the UAVs is not beneficial where extended duty times are required or where extended autonomous operation is desired for a fleet of UAVs.

Some conventional systems require the UAV to land on, or be moved to (manually or automatically), a position on a landing pad for autonomous operation on the UAV. For a larger UAV with low landing accuracy, the resources and cost required to move the larger UAV to the desired position on the landing pad is not practical for autonomous operation on the larger UAV.

In view of the foregoing, a need exists for an improved UAV base station system and method for autonomous exchange of UAV batteries in an effort to overcome the aforementioned obstacles and deficiencies of conventional UAV systems.

Figure 1:
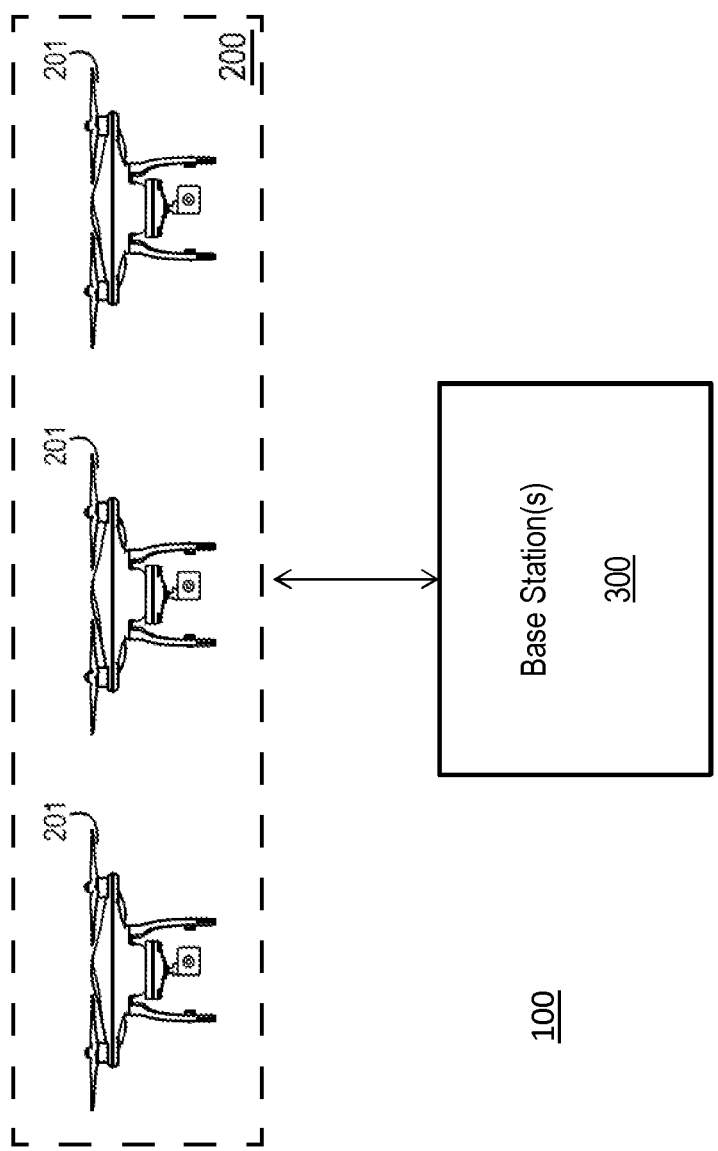
FIG. 1 is an exemplary top-level block diagram illustrating an embodiment of a mobile platform management system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available mobile platform management systems are deficient because they fail to accommodate larger mobile platforms, a mobile platform base station that provides autonomous maintenance (e.g., battery/payload swapping) can prove desirable and provide a basis for a wide range of mobile platform applications, such as the ability for unmanned aerial vehicle (UAV) systems to perform longer autonomous missions. This result can be achieved, according to one embodiment disclosed herein, by a mobile platform management system 100 as illustrated in FIG. 1.

Turning to FIG. 1, the mobile platform management system 100 is shown as including a base station 300 for management of a mobile platform 200. The mobile platform management system 100 is suitable for use with a wide range of mobile platforms. In one embodiment, the mobile platform management system 100 can be suitable for use with multiple mobile platforms 200, such as one or more UAVs 201. For example, one popular UAV type is an aerial rotorcraft that is propelled by multiple rotors. A rotorcraft having four rotors is known as a quadcopter, quadrotor helicopter, or quad rotor. Such a rotorcraft provides the UAV with a high range of motion, allowing, e.g., vertical takeoff and landing as well as the ability to hover in mid-air for still aerial image acquisition or fly over large fields to spray pesticides. Various UAV types are suitable for the mobile platform management systems and methods, including other rotor designs, e.g., single rotor (e.g., helicopter), dual rotor, trirotor, hexarotor, and octorotor designs. Fixed-wing and hybrid rotorcraft-fixed wing UAVs can also be used.

The UAVs 201 of the mobile platform management system 100 can have features that allow the UAVs 201 to be remotely controlled by a user and/or autonomously piloted. In many mobile platform management applications, it can be advantageous that UAVs 201 be capable of both remote and autonomous control so that the UAVs 201 can be switched between remote and autonomous control as needed. During flight, it can be advantageous for a user to have some degree of control of the UAV 201. The UAV 201 thereby can be directed to regions of interest to the user and acquire desired data regarding the region of interest. However, should the UAV 201 lose communication with the base station 300 and/or require fueling/battery replacement, autonomous piloting can take over control of the UAV 201, directing the UAV 201 to follow a pre-set course and/or to return to a home location, such as the base station 300 for routine maintenance. For example, some quadcopter models have automatic homing features that use global positioning systems (GPS) systems to allow the quadcopter to return to its ground location as the need arises. Similarly, under certain routine deployment circumstances, e.g., deployment to a given region of interest prior to the time that the user takes control and/or during redeployment to a different ground station, it may be advantageous that the UAV 201 have some degree of autonomous control.

The UAVs 201 associated with the mobile platform management system 100 can be equipped with various control systems and sensors (not shown) for controlling flight operations and returning to a selected base station 300. The control systems can, for example, control flight characteristics such as attitude (pitch, roll, and yaw), velocity, and so on of the UAVs 201. Exemplary sensors relating to flight operations include inertial sensors such as inertial measurement units (IMUs) that typically rely on a combination of accelerometers, gyroscopes, and sometimes magnetometers to report on a selected UAV's velocity, orientation, and gravitational forces. The UAV 201 can rely on other sensors, e.g., pressure sensors, temperature, wind speed, and altitude sensors, to assist in its flight operations. Through various computational operations—such as integral operations—a position of the UAV 201 can be extrapolated from such sensor data. Alternatively, the UAVs 201 can sense their own position, for example, through a global positioning system (GPS). In some embodiments, the UAVs 201 are equipped with both inertial sensors and GPS systems, which can be used in complement with one another.

In some embodiments, the UAVs 201 of the mobile platform management system 100 can be equipped with appropriate instruments (not shown) that may require management at the base station 300, such as for capturing data regarding a region of interest for virtual sightseeing. It is generally advantageous that the instruments be lightweight and able to provide high-frequency data feeds to other components of mobile platform management system 100 to facilitate real-time collection of visual and non-visual data and/or presentation of the collected data in real time. In some embodiments, the UAVs 201 can be equipped with various instruments for collecting visual data, such as a variety of conventional cameras for image and/or video acquisition. Additionally and/or alternatively, the UAVs 201 can be equipped with thermographic cameras for thermal imaging, spectrum cameras for spectral imaging, and so on. The UAVs 201 can be uniformly and/or differently equipped.

Additionally and/or alternatively, the UAVs 201 can also be equipped with various instruments for other flight tasks relating to transportation of a variety of payloads (e.g., fuel, a parcel and/or cargo), agriculture (e.g., spraying water, fertilizer, and/or pesticides over a farm), fire-fighting, and so on. Some examples of instruments for transportation of payloads include, but are not limited to, fuel tanks, spray tanks, centrifugal pumps, spray booms, check valves, spray nozzles, and so on.

The UAVs 201 of the mobile platform management system 100 and method 1000 (shown in FIG. 10) can be uniformly equipped and/or differently equipped. A selected UAV 201 equipped in a particular manner can be selected for deployment based upon a flight task criterion (e.g., an agricultural task, a transportation expedition, a sightseeing request, a characteristic of the region of interest, other sightseeing variables, and so on). For example, the selected UAV 201 can include both virtual sightseeing equipment and pesticide spraying systems for precision agriculture. Advantageously, such combination equipment can reduce over spraying and spreading on farms by determining specific areas of the farms that need more attention.

As an additional example, the selected UAV 201 can be equipped with floodlights and/or night vision for use during night sightseeing or cave-exploration. In another example, the selected UAV 201 can be equipped with specialized cold-weather proofing and used for exploration of cold regions. In some cases, each geographical sightseeing area can be assigned a group of UAVs 201 that are specially equipped for the characteristics that area. Alternatively, it may be advantageous to equip each UAV 201 uniformly, or have some overlap of functionality capacity, so that the UAVs 201 are interchangeable in case of one of the UAVs 201 experiences a malfunction and requires management at the base station 300.

The UAVs 201 of the mobile platform management system 100 can be equipped to communicate wirelessly with the base station 300. A selected UAV 201 associated with the mobile platform management system 100 can be likened to a communications endpoint, e.g., a cell phone, within a wireless communications network. Thus, any conventional wireless communication protocol appropriate for communications endpoints can be suitable for use to facilitate communications between the UAVs 201, the base station 300, and any other components of the mobile platform management system 100. For example, the UAV 201 can establish data uplink and/or downlink channels with the base station 300 for navigation, localization, data transmission, and the like. Suitable wireless communication media can include any category of conventional wireless communications, for example, radio, Wireless Fidelity (Wi-Fi), cellular, satellite, and broadcasting. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In certain embodiments, the UAVs 201 and the base station 300 of the mobile platform management system 100 mutually communicate via 3G or 4G (i.e., third generation or fourth generation) mobile telecommunications technologies. In other embodiments, UAVs 201 can use 5G (i.e., fifth generation) mobile telecommunications networks to facilitate communications between the relevant subsystems of the mobile platform management system.

In some embodiments, the wireless communications between the subsystems of the mobile platform management system 100 can be encrypted, as may be advantageous for secure flight task applications. Suitable encryption methods include, but are not limited to, internet key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like. Encryption methods specifically designed for mobile platform management systems may also be suitable.

Thus, existing wireless technologies for use by current telecommunications endpoints can be readily adapted for use by the UAVs 201. For example, by outfitting each UAV 201 with a wireless card like those used for mobile phones, or other suitable wireless communications hardware, the UAVs 201 can easily be integrated into existing networks. Alternatively, and/or additionally, proprietary communications hardware can be used as needed.

As shown in FIG. 1, the base station 300 can cooperate with the mobile platform 200. While the base station 300 and the mobile platform 200 are represented schematically as single subsystems of the mobile platform management system 100, more than one base station 300 can cooperate with a selected mobile platform 200. Similarly, more than one mobile platform 200 can cooperate with a selected base station 300. In certain embodiments, a selected base station 300 is associated with a geographical location where the UAVs 201 can land, thereby providing anchor or "home" locations for the UAVs 201. For example, each UAV 201 can be programmed to return to a selected base station 300 as a matter of default when, for example, the UAV 201 is low on power, flies out of range, requires a payload drop-off and/or pick-up, completes a flight task, encounters unexpected operating conditions, and so on. In some embodiments, the base station 300 can be a vacant land area where the UAV 201 is allowed to land safely until it can be manually located, recharged, and/or maintained for further operation. In other embodiments, the base station 300 can include additional support systems, which will be further described below.

In some embodiments, each base station 300 is configured to accommodate a single UAV 201; however, in other embodiments, each base station 300 is configured to simultaneously accommodate a plurality of the UAVs 201.

Figure 2:
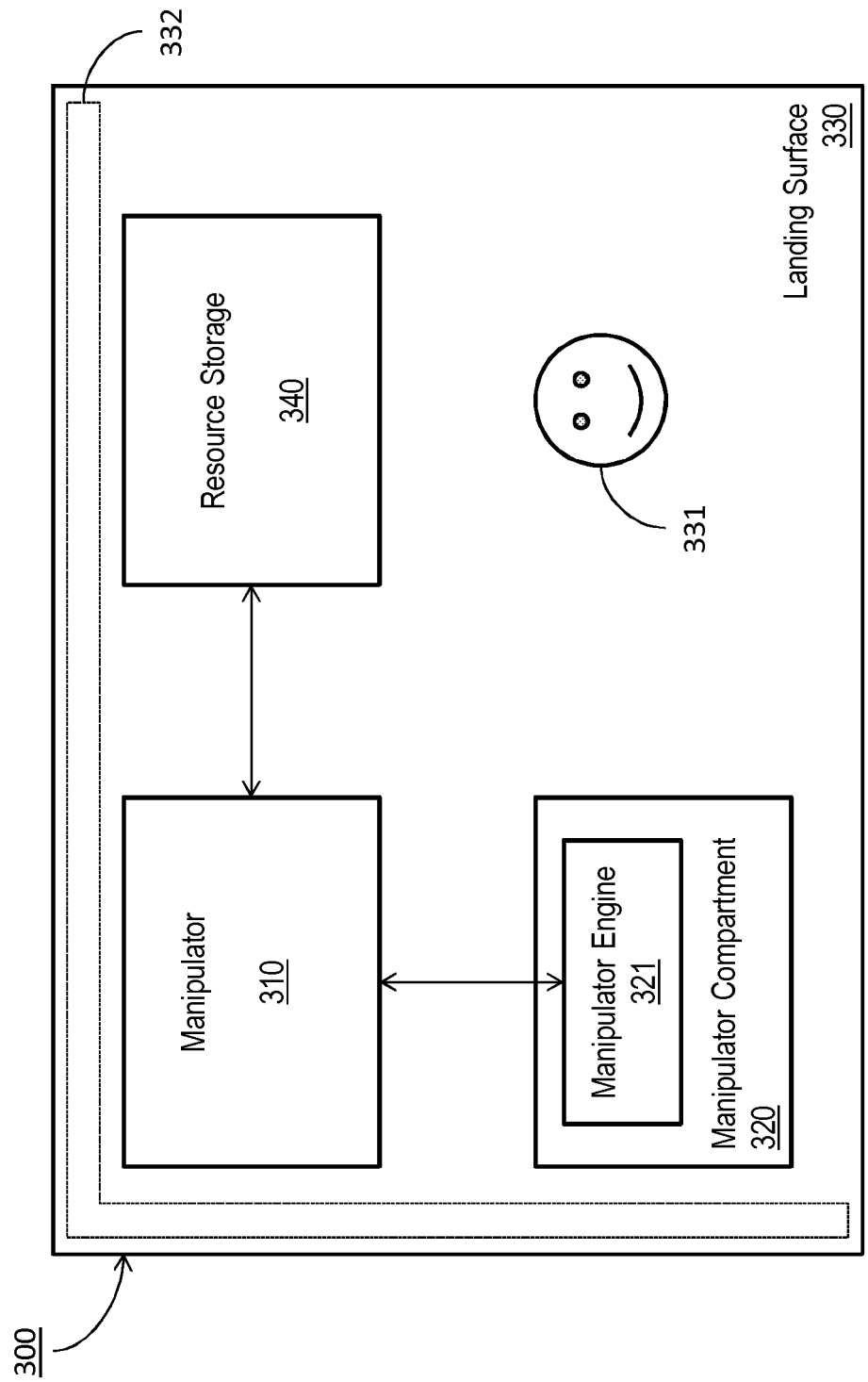
FIG. 2 is an exemplary top-level block diagram illustrating one embodiment of a base station of the mobile platform management system of FIG. 1.

Turning now to FIG. 2, an exemplary embodiment of the base station 300 is illustrated in further detail. The base station 300 can be lightweight and portable so as to be unobtrusive and easily moved when relocation of the base station 300 is desired. The base station 300 can include a manipulator 310 operated by a manipulator compartment 320. In some embodiments, the manipulator compartment 320 includes a hardware and software infrastructure for providing a mobile platform management user interface (not shown). For example, the mobile platform management user interface can include a display and/or input system (not shown) for enabling a user to interact with the base station 300 and/or a selected UAV 201 associated with the base station 300. Exemplary interactions can include setting a flight parameter and/or reading a status of the base station 300 and/or the selected UAV 201. In one embodiment, the display and input system can be at least partially integrated as a touchscreen system. The users can also communicate with the base station 300 with a user device (e.g., smartphone, tablet, personal computer) via wireless and/or wired (e.g., universal serial bus) communications. Therefore, the users can monitor the status of a flight task, set flight task parameters, and/or manually override the control of a selected UAV 201. The manipulator compartment 320 thereby provides various input and output functions for the mobile platform management system 100 (shown in FIG. 1). The manipulator compartment 320 can perform many of the input and output functions for a user interface, including functions related to maintenance of the UAVs 201, data output/presentation, and support.

Additionally and/or alternatively, the manipulator compartment 320 can perform the control functions for the manipulator 310. Thus, the manipulator compartment 320 further includes a manipulator engine 321 for driving physical movements of the manipulator 310. In some embodiments, the manipulator engine 321 is configured to drive the manipulator 310 with at least four degrees of freedom. For example, the manipulator 310 is operable to translate linearly along an axis X (shown in FIG. 5) and an axis Y (shown in FIG. 5) that extends substantially perpendicularly to the axis X. The manipulator engine 321 can also adjust the height of the manipulator 310 along an axis Z (shown in FIG. 5), which is normal to the axis X and the axis Y, and rotate the manipulator 310 at least 360 degrees. In some embodiments, the control functions for the manipulator 310 can operate without user interaction. Such functions of the manipulator compartment 320 are described in more detail below with reference to FIGS. 3-7.

The manipulator 310 provides resources to the mobile platform 200 from resource storage 340. In some embodiments, the resource storage 340 includes a charging station for recharging and storing batteries that power the UAVs 201 (shown in FIG. 6), power stations (not shown) for providing power sources (e.g., other than electricity) to the UAVs 201, fuel stations, payload (e.g., pesticides) replacements, data storage transmission systems (e.g., hard disks, universal serial bus (USB) adapters, Ethernet coupling systems, machines having combinations thereof, and so on), combinations of any of the preceding, and the like. In some embodiments, the resource storage 340 can provide power, such as electrical power and/or operating power, to the UAVs 201 via wired and/or wireless power transmission. The power provided by the resource storage 340 can be used to replenish one or more resources, such as a rechargeable battery system, of a relevant UAV 201. The resources available from resource storage 340 can vary to accommodate for various flight tasks of the mobile platform 200.

While shown and described as comprising a single manipulator 310 and a single resource storage 340 for purposes of illustration only, the base station 300 can comprise more than one manipulator 310 and/or more than one resource storage 340 that can cooperate with a selected mobile platform 200. For example, two manipulators 310 simultaneously can cooperate with the selected mobile platform 200 for exchanging a battery and unloading cargo from the resource storages 340 at the same time.

As shown in FIG. 2, the base station 300 can further provide a landing surface 330 for receiving the mobile platform 200 (e.g., UAVs 201). To aid the UAVs 201 in landing on the landing surface 330, communication between the UAVs 201 and the base station 300 may be used to direct the UAVs 201 to the general location of the landing surface 330. As discussed above, the communication between the UAVs 201 and the base station 300 may occur wirelessly. In one example, the UAV 201 may employ GPS or other location-based software to locate the base station 300. The GPS or other location-based techniques can be used to get a selected UAV 201 to the vicinity of the base station 300. The wireless communication directs the UAV 201 within a predetermined range of the base station 300, wherein the UAV 201 can sense one or more elements/subsystems of the base station 300. For instance, the UAV 201 may be brought into a line-of-sight of the manipulator compartment 320. A landing area marker 331, or any unique landing marker, may aid in further pinpointing the location of the landing surface 330. As desired, the landing area marker 331 can be provided on the landing surface 330 and may serve as a confirmation of the landing surface 330 on which the UAV 201 may land. The landing area marker 331 may also differentiate the landing surface 330 from other objects or regions.

In some embodiments, the landing area marker 331 may indicate a landing position of the UAV 201 on the landing surface 330. The landing area marker 331 may be used as a fiducial marker, which may aid the UAV 201 in navigating to a proper landing position on the landing surface 330. In some examples, multiple landing area markers 331 may be provided, which may aid the UAV 201 to land in a desired position. For example, multiple landing area markers 331 can be used for a larger landing surface 330 that accommodates multiple UAVs 201 and/or provide boundaries for a single UAV 201. In some instances, it may also be desirable for the UAV 201 to have a particular orientation when docking with the base station 300. In one example, the landing area marker 331 may include an asymmetric image, a letter of the alphabet, and/or code that may be discernible by the UAV 201. The landing area marker 331 may be indicative of the orientation of the base station 300 relative to the UAV 201. Thus, the UAV 201 can find proper orientation when landing on the landing surface 330.

The landing area marker 331 may also be indicative of a distance of the base station 300 relative to the UAV 201. The distance may be used separate from or in combination with one or more other sensors of the UAV 201 to determine the altitude of the UAV 201. For example, if the size of the landing area marker 331 is known, the distance from the UAV 201 to the landing area marker 331 may be gauged depending on a size of the landing area marker 331 showing up in the sensors (not shown) of the UAV 201.

In one example, the landing area marker 331 may be provided at a particular location relative to a desired landing spot of the UAV 201 on the landing surface 330. The UAV 201 may be capable of landing on the landing surface 330 with great precision. The landing area marker 331 may help guide the UAV 201 to the desired landing spot. For instance, the landing area marker 331 may be located 10 cm in front of the center of the desired landing point of the UAV 201. Alternatively, multiple landing area markers 331 may be provided such that the desired landing spot may fall between the multiple landing area markers 331. The UAV 201 may use the markers to help orient the UAV 201 and/or position its landing between the markers. Distance between the markers may aid the UAV 201 in gauging the distance from the UAV 201 to the landing surface 330.

The landing area marker 331 may be placed in a location that is easily discernable from flight (e.g., aerial top-view). In some instances, the landing area marker 331 may be provided on an exterior surface of the base station 300 (e.g., on an external surface of the manipulator 310 and/or manipulator compartment 320). The landing area marker 331 may include a transmitter (not shown) for relaying a wireless signal being emitted by the base station 300. The origin of the signal may be from outside the base station 300 and/or within the base station 300 (e.g., manipulator compartment 320). Alternatively, the base station 300 may emit signals in the infrared (IR), ultraviolet (UV), radio, and/or audio frequency band.

In one example, the landing area marker 331 may be positioned less than about 100 cm, 90 cm, 80 cm, 75 cm, 70 cm, 65 cm, 60 cm, 55 cm, 50 cm, 45 cm, 40 cm, 35 cm, 30 cm, 25 cm, 20 cm, 15 cm, 12 cm, 10 cm, 8 cm, 7 cm, 6 cm, 5 cm, 4 cm, 3 cm, 2 cm, or 1 cm from where the UAV 201 should attempt to land on the landing surface 330.

Data pertaining to the detected landing area marker 331 may be provided to one or more processors (not shown). The processors may be on board the UAV 201. Based on the received information about the detected landing area marker 331, the processors may, individually or collectively, generate a command signal. The command signal may drive propulsion units (not shown) of the UAV 201. For example, the propulsion units may be driven to cause the UAV 201 to land on the landing surface 330 adjacent to the detected landing area marker 331, when the detected landing area marker 331 is determined to be associated with the base station 300. The detected landing area marker 331 may indicate the state of charge of the stored batteries (not shown) at the base station 300. For example, if the base station 300 has a fully-charged battery available, the detected landing area marker 331 may result in a command from the processor to land the UAV 201. In another example, if the base station 300 does not have a charged battery available, the detected landing area marker 331 may result in a command from the processor to continue traveling to the next-closest base station 300 with an available charged battery. Thus, a UAV 201 may be able to land in an autonomous or semi-autonomous fashion in response to a detected landing area marker 331. The UAV 201 may be capable of landing without receiving any commands or manual input from the user.

In some embodiments, the sensors (not shown) on board the UAV 201 may be used to detect the landing area marker 331 and processing may occur on-board the UAV 201. The UAV 201 may be capable of landing itself on the landing surface 330 without requiring further guidance or information from the base station 30 once the UAV 201 has confirmed that the landing area marker 331 is associated with the base station 300.

The base station 300 may send information about its location to a selected UAV 201 (or broadcast the location information to all UAVs 201). The base station 300 may have a location unit (not shown) capable of determining positional information. The base station 300 may receive information from the UAV 201 about the location of the UAV 201, the state of the battery on board the UAV 201, and/or the level of fuel remaining on the UAV 201. For example, coordinate information, such as GPS coordinates, for the UAV 201 may be provided to the base station 300. In another example, the UAV 201 may communicate the remaining charge percentage of the battery currently in use on the UAV 201. The base station 300 may have a communication unit (e.g., manipulator compartment 320) capable of communicating with the UAV 201. The base station 300 may have a processor (not shown) capable of identifying and/or calculating a location of the UAV 201.

Additionally and/or alternatively, the processor of the base station 300 may be capable of identifying and/or calculating a location of the next nearest battery exchange station (not shown). For example, the UAV 201 may communicate to the base station 300 that the battery currently on board the UAV 201 has a remaining charge percentage of 18%. In some embodiments, the processor of the base station 300 can calculate a distance to the next nearest battery exchange station in the flight path of a particular UAV 201 to determine whether the UAV 201 should stop at the base station 300 for maintenance or continue to the next nearest battery exchange station with an available charged battery.

Once the UAV 201 has landed, the specific landing accuracy of the UAV 201 on the landing surface 330 can depend on a number of landing properties (e.g., weather, sensor accuracy, and so on). As discussed above, conventional mobile platform management systems require movement of the UAV 201 to a specific position on the landing surface 330 for autonomous operation on the UAV 201. However, for larger UAVs 201, the resources and cost required to move the larger UAV 201 to the desired position on the landing surface 330 is not practical for autonomous operation on the larger UAV 201. Accordingly, the base station 300 can accommodate for low-accuracy landing of the UAV 201.

Figure 3:
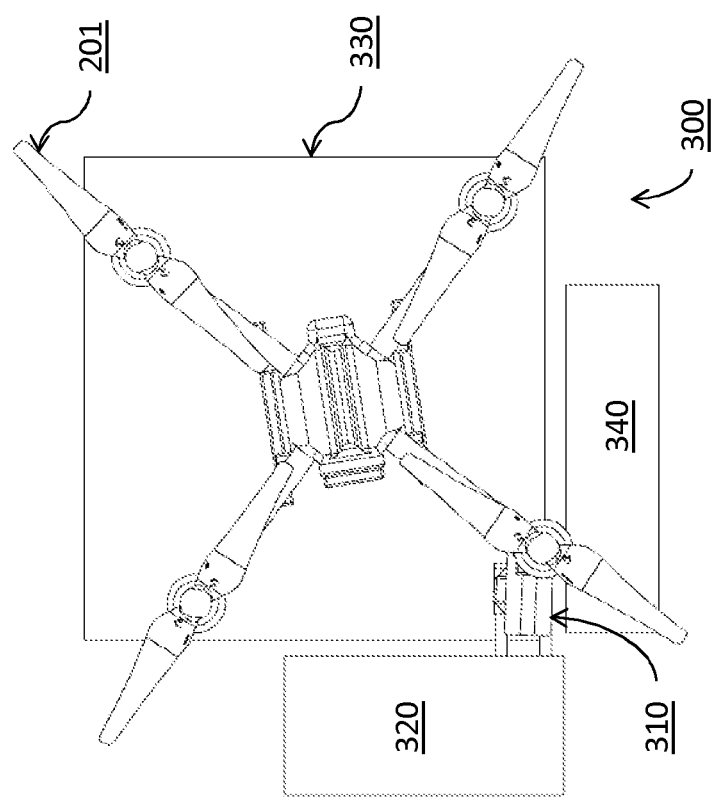
FIG. 3 is an exemplary top-view illustrating an embodiment of the manipulator of the base station of FIG. 2 in a first position.

With reference now to FIG. 3, the UAV 201 lands on the landing surface 330, for example, within 20 cm of the landing marker 330 (shown in FIG. 2). As shown in FIG. 3, prior to and during the UAV 201 landing, the manipulator 310 is coupled to the manipulator compartment 320 on the lower left of the landing surface 330 to provide for a landing area on the landing surface 330 that is free of physical interference. Similarly, the resource storage 340 is situated away from the landing surface 330 while being accessible to the manipulator 310. As used herein, the position of the manipulator 310, the manipulator compartment 320, and the resource storage 340 relative to the landing surface 330 that is shown in FIG. 3 is referred to as a "home" position of the base station 300.

After the UAV 201 lands, a sensor 332 (shown in FIG. 2) on the base station 300 can determine the location of the landed UAV 201 on the landing surface 330. As a non-limiting example, the sensor 332 can include first and second optical sensors, located on respective perpendicular axes relative to the landing surface 330, and can ascertain position information of the UAV 201. Accordingly, each optical sensor can provide a Cartesian coordinate on a horizontal plane parallel to the landing surface 330. With the first and second optical sensor located on respective perpendicular axes, the coordinates can represent the position of the perpendicular projection of the UAV 201 onto the two axes, expressed as signed distances from a predetermined point, such as the manipulator compartment 320. Additionally and/or alternatively, the sensor 332 can include, but is not limited to, any number of contact image sensors, electro-optical sensors, infra-red sensors, kinetic inductance detectors, light-emitting diode (LED) as light sensors, fiber optic sensors, optical position sensors, photodetectors, pressure sensors, photoresistors, phototransistors, thermal or temperature sensors, proximity sensors, electric current sensors, magnetic sensors, radio sensors, and so on.

The manipulator compartment 320 can use the position information of the UAV 201 to control the manipulator 310 via the manipulator engine 321 to move from the home position to the UAV 201.

Figure 4:
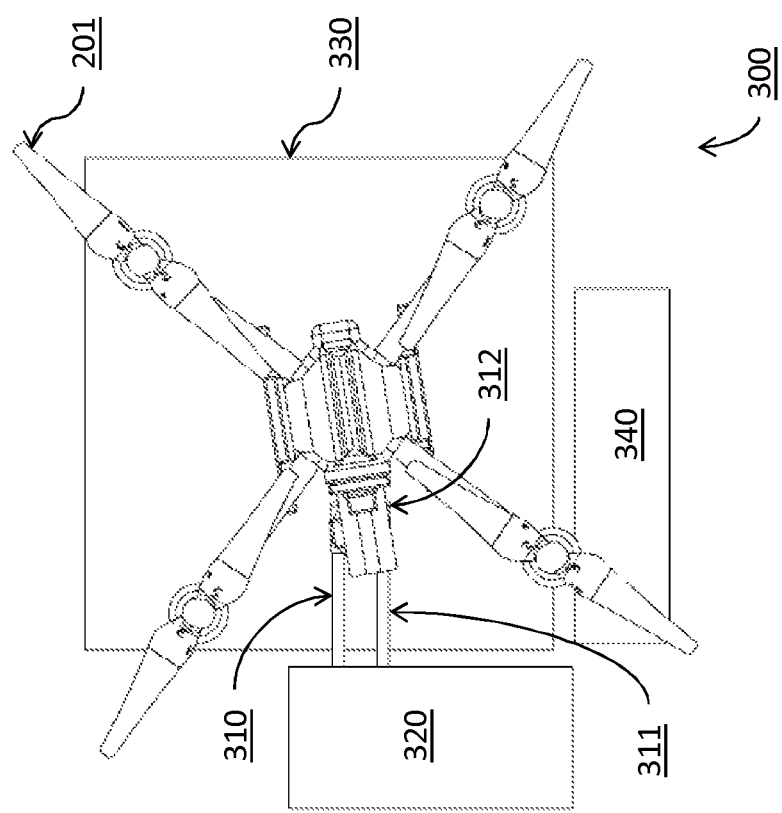
FIG. 4 is an exemplary top-view illustrating an embodiment of the manipulator of FIGS. 2 and 3 in a second position.

Turning to FIG. 4, the manipulator 310 is shown as including a manipulator arm system 311 having a manipulator carriage 312 on a distal end of the manipulator arm system 311. The manipulator arm system 311 can be directly and/or indirectly coupled to the manipulator engine 321. In some embodiments, a manipulator rail system (not shown) can be used to provide a drive path for the manipulator arm system 311.

As shown in FIG. 4, the manipulator engine 321 has extended the manipulator arm system 311 away from the manipulator compartment 320. Stated in another way, the manipulator carriage 312 has translated from the home position along the axis X and the axis Y to the UAV 201 based on ascertained position information of the UAV 201. To accommodate for UAVs 201 that may require unique maintenance at one or more positions of the UAV 201, the manipulator carriage 312 can elevate and/or lower to a desired height, such as along the axis Z shown in FIG. 5.

In some embodiments, the UAV 201 includes one or more service markers (not shown), each on a predetermined and unique location of the UAV 201 to indicate service locations on the UAV 201. For example, a selected UAV 201 may include a unique code or asymmetric shape on its battery compartment (not shown) such that the manipulator compartment 320 can identify the service marker for a precise service area. The service marker for the battery compartment thereby can be distinguished from a different service marker on the UAV 201 that is used to indicate a payload storage compartment. Thus, similar to the function of the landing area marker 331, once the manipulator compartment 320 locates the desired service marker on the UAV 201, the manipulator engine 321 can direct the manipulator carriage 312 to the specific location of the battery compartment.

In other embodiments, the service locations on the UAV 201 are known to the base station 300. For example, a fleet of UAVs 201 can each have a battery compartment in a predetermined position that is common to the other UAVs 201 of the fleet. Thus, once the location of the UAV 201 on the landing surface 330 is determined, the manipulator engine 321 can direct the manipulator carriage 312 to the battery compartment without the need for service markers.

Figure 8:
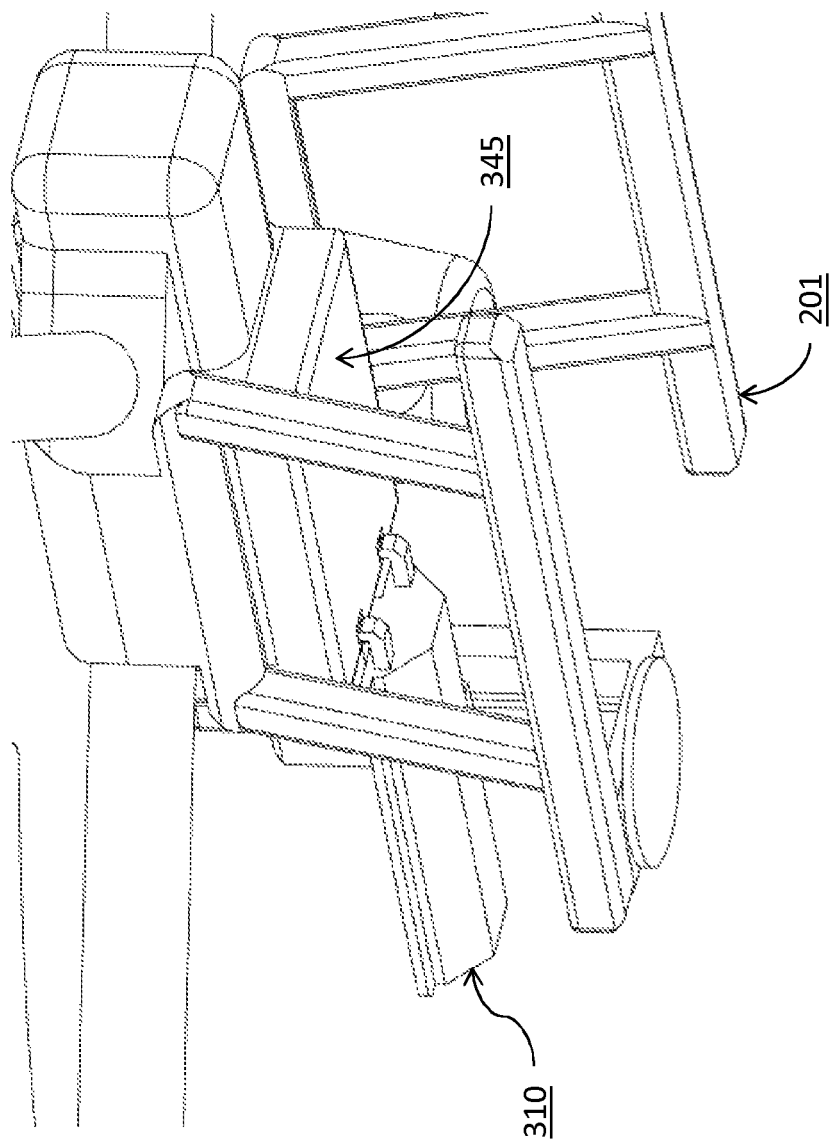
FIG. 8 is an exemplary view illustrating one embodiment of the undercarriage of a selected mobile platform interfacing with the manipulator of FIG. 2.
Figure 9:
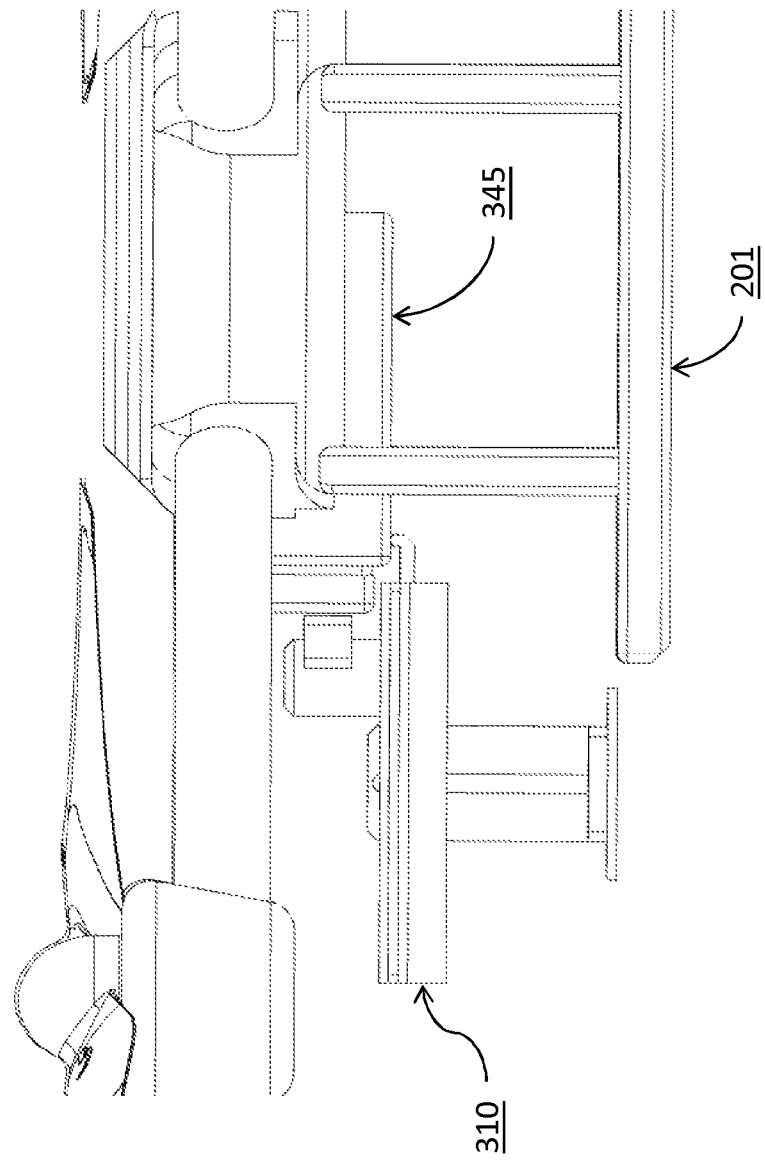
FIG. 9 is another view illustrating an embodiment of the undercarriage of the selected mobile platform of FIG. 8 interfacing with the manipulator of FIG. 2.

Even further, the manipulator carriage 312 rotates, for example, with 360-degrees of freedom, to accommodate maintenance that requires varying angles of operation. In one example, the manipulator carriage 312 can grasp a battery 345 (shown in FIG. 8 and FIG. 9) situated in the UAV 201, remove the battery 345 from the UAV 201, insert a charged battery into the UAV 201, and place the removed battery 345 in a battery compartment (shown in FIG. 6) for charging. Depending on the particular UAV 201, removing the battery 345 may require rotation of the manipulator carriage 312 to free the battery 345 from the UAV 201. In another example, the manipulator carriage 312 can be configured to provide fuel for a particular UAV 201 that includes an engine, such as an internal combustion engine, that can require refueling). In this manner, the base station 300 advantageously can operate as a gas (or refueling)

station for the UAV 201. The varying degrees of freedom of the manipulator 310 advantageously accommodate maintenance relating to a number of flight tasks (e.g., replacing fuel, replacing pesticides, and transmission of electronic data including bidirectional data transfer).

Figure 6:
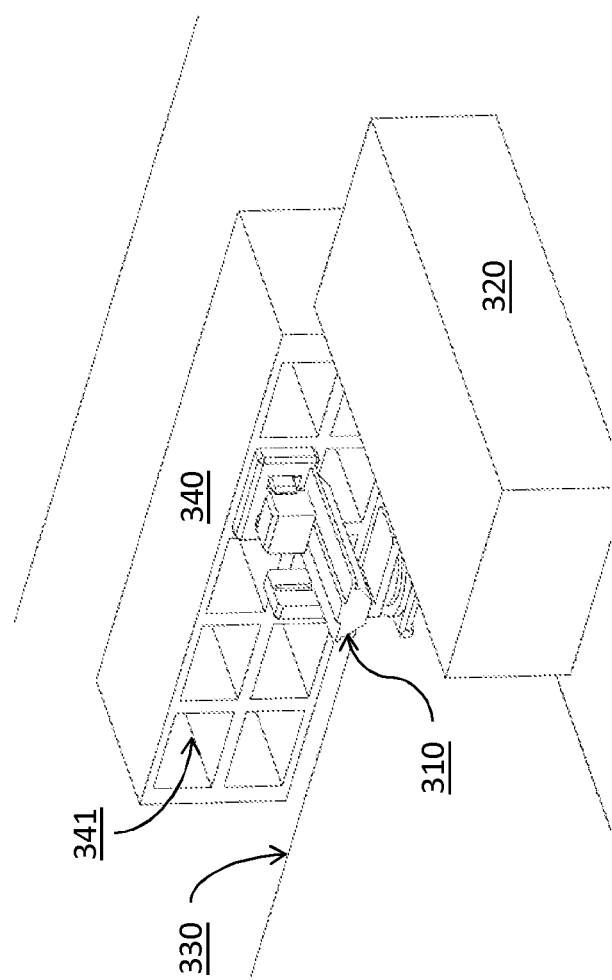
FIG. 6 is an exemplary perspective view illustrating an embodiment of the manipulator of FIG. 2 returning a battery to a resource compartment.
Figure 7:
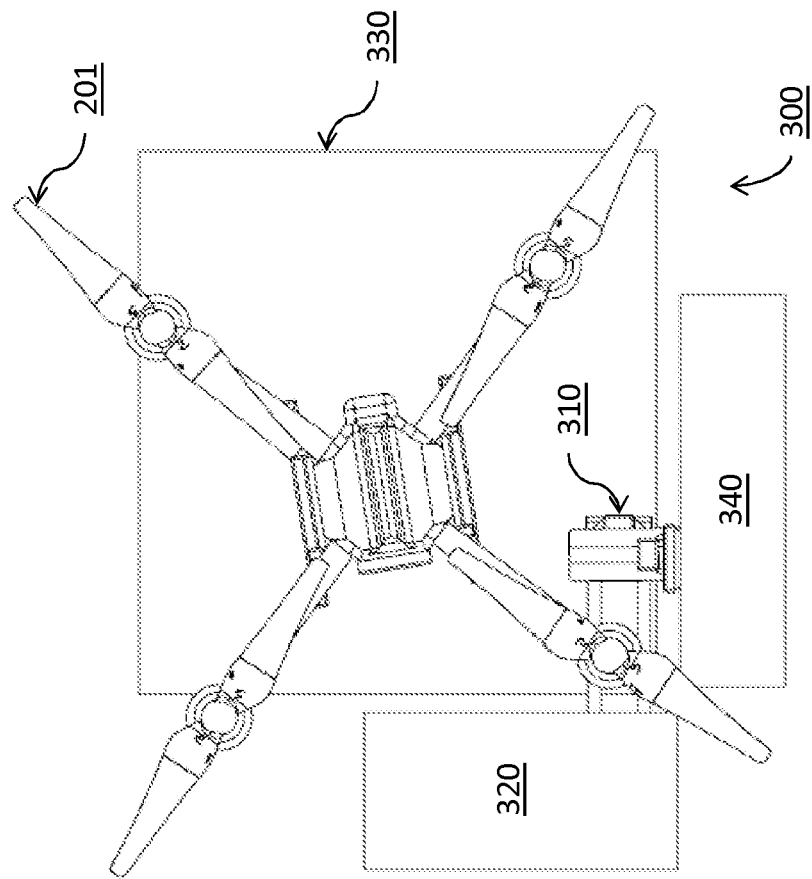
FIG. 7 is an exemplary top-view illustrating an embodiment of the manipulator of FIG. 6.

Once the battery 345 has been removed from the UAV 201, the battery 345 can be placed in the resource storage 340 for recharging. One example is shown in FIGS. 6 and 7. With specific reference to FIG. 6, the resource storage 340 is illustrated as including a battery-matrix that forms a plurality of battery-charging slots 341. Each battery-charging slot 341 is configured to store a respective battery 345. As depicted in FIG. 6, the battery-matrix comprises two stacked rows of battery-charging slots 341, where each row comprises five battery-charging slots 341.

Although a specific configuration of the battery-matrix is shown and described with reference to FIG. 6, for purposes of illustration only, any suitable arrangement of battery-charging slots 341 within the battery-matrix may be provided. The battery matrix can include any suitable number of battery-charging slots 341. The number of battery-charging slots 341 can depend on the number of UAVs 201 in the mobile platform management system 100, charging time of the battery pack 345, desired mission time, or the like. For example, some embodiments of the base station 300 may include fewer battery-charging slots 341 or may include many more battery-charging slots 341. The battery-charging slots 341 may have any suitable size and/or shape based on the type of the battery-pack 345 to be held therewithin, and, in some embodiments, the battery-matrix may be configured to hold a plurality of uniform and/or different battery pack types, which may include different shapes, cross sections, voltages, currents, or the like. In some embodiments, there may be any suitable number of rows and/or columns in the battery-matrix, and further embodiments may include battery-charging slots 341 in any other suitable regular or non-regular configuration, that may or may not include rows or columns. In some embodiments, there may be a plurality of battery-matrices and/or the battery-matrix may be three dimensional compared to the two dimensional arrangement depicted herein (i.e., a first dimension of rows, and a second dimension of columns).

After maintenance on the UAV 201 is completed, the manipulator 310 can return to the home position, and the UAV 201 is ready to fly again.

Figure 10:
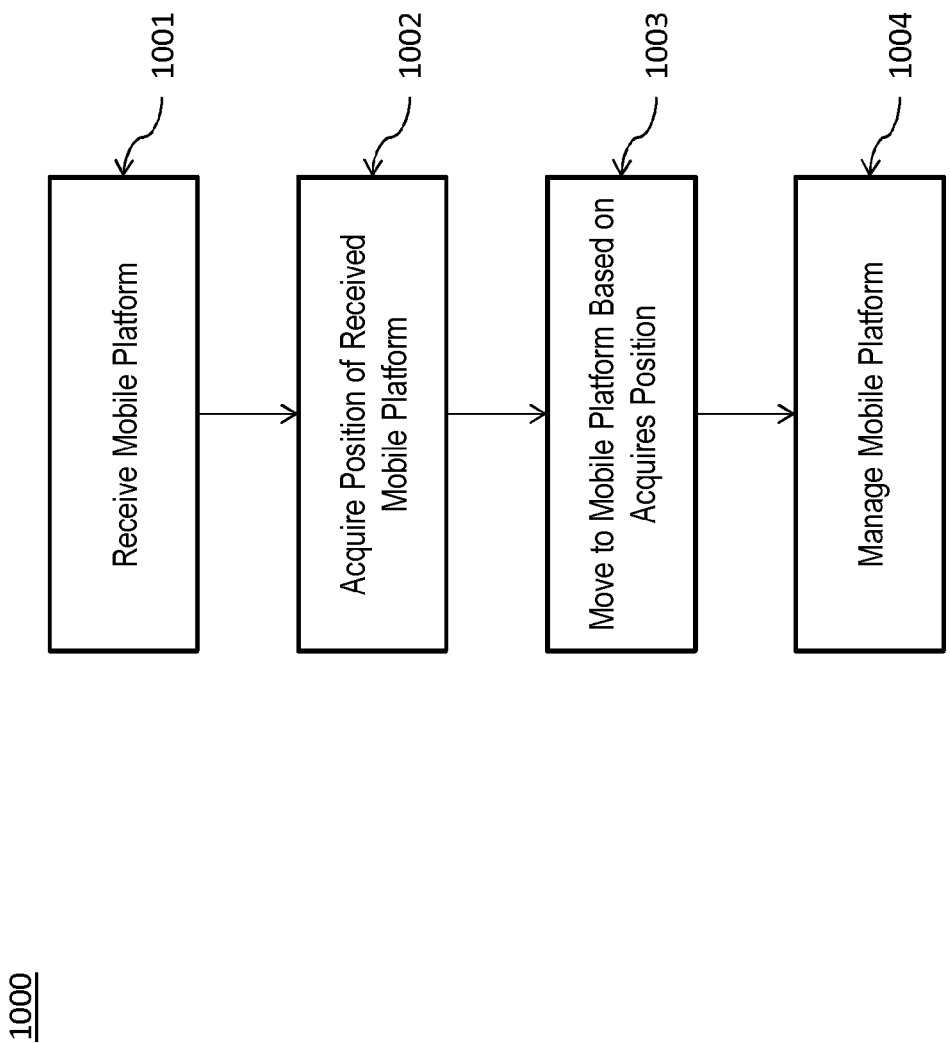
FIG. 10 is an exemplary flowchart illustrating one embodiment of a method of mobile platform management using the mobile platform management system of FIG. 1.

The mobile platform management system 100 can manage the mobile platforms in any suitable manner discussed above, including via an exemplary process 1000 for mobile platform management, shown in FIG. 10. With reference to FIG. 10, the exemplary process 1000 for mobile platform management of the UAVs 201 is shown as including a plurality of processes, which need not be performed in the order depicted.

Figure 5:
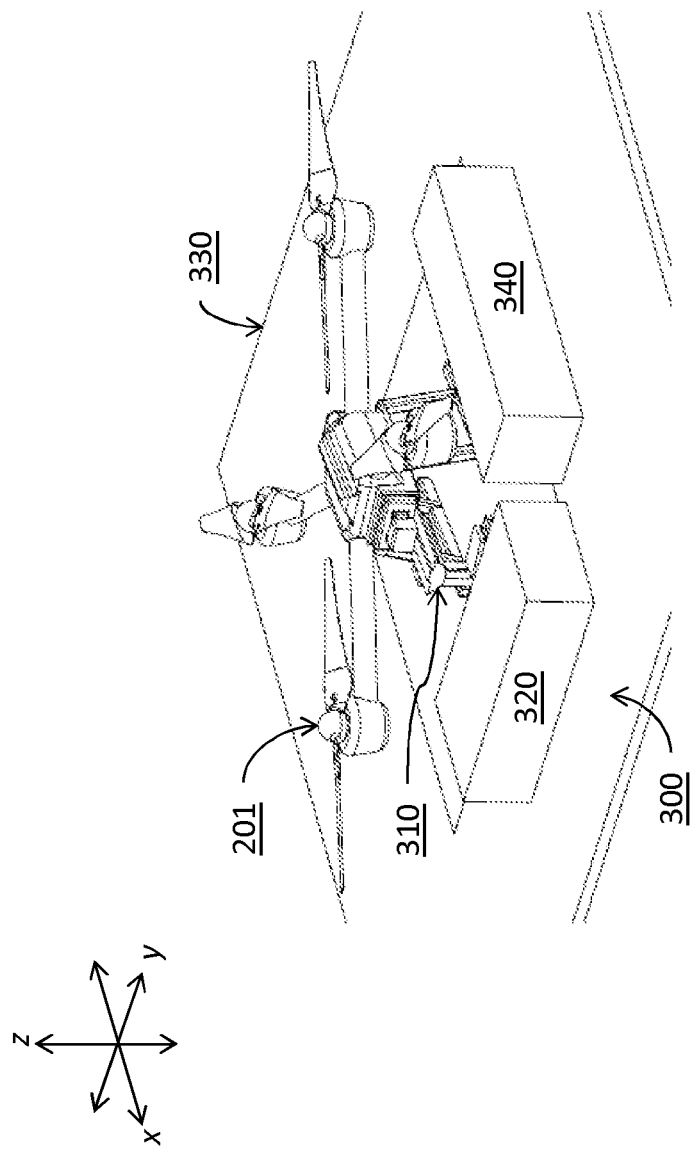
FIG. 5 is an exemplary perspective view illustrating the second position of the manipulator of FIG. 4.

At 1001, the landing surface 330 (shown in FIGS. 2-7) receives the mobile platform 200 (shown in FIGS. 3-5). As discussed in more detail above, a variety of methods are suitable for assisting the mobile platform 200 in locating the landing surface 330 (shown in FIGS. 2-7) of the base station 300. Once the mobile platform 200 has landed, the base station 300 acquires the position of the mobile platform 200, at 1002, in any manner described herein.

Based on the acquired position, the manipulator 310, at 1003, moves to the location of the mobile platform 200 (shown in FIGS. 4 and 5) and performs one or more management functions, at 1004. In the examples described above, the base station 300 is operable for payload and battery maintenance. Furthermore, the mobile platform management system 100 is operable to perform any suitable task discussed above to the mobile platforms, including, for example, an exemplary process 1100 for payload and battery maintenance (shown in FIG. 11) and an exemplary process 1200 for coupling a physical cable to the mobile platform 200 (shown in FIG. 12).

Figure 11:
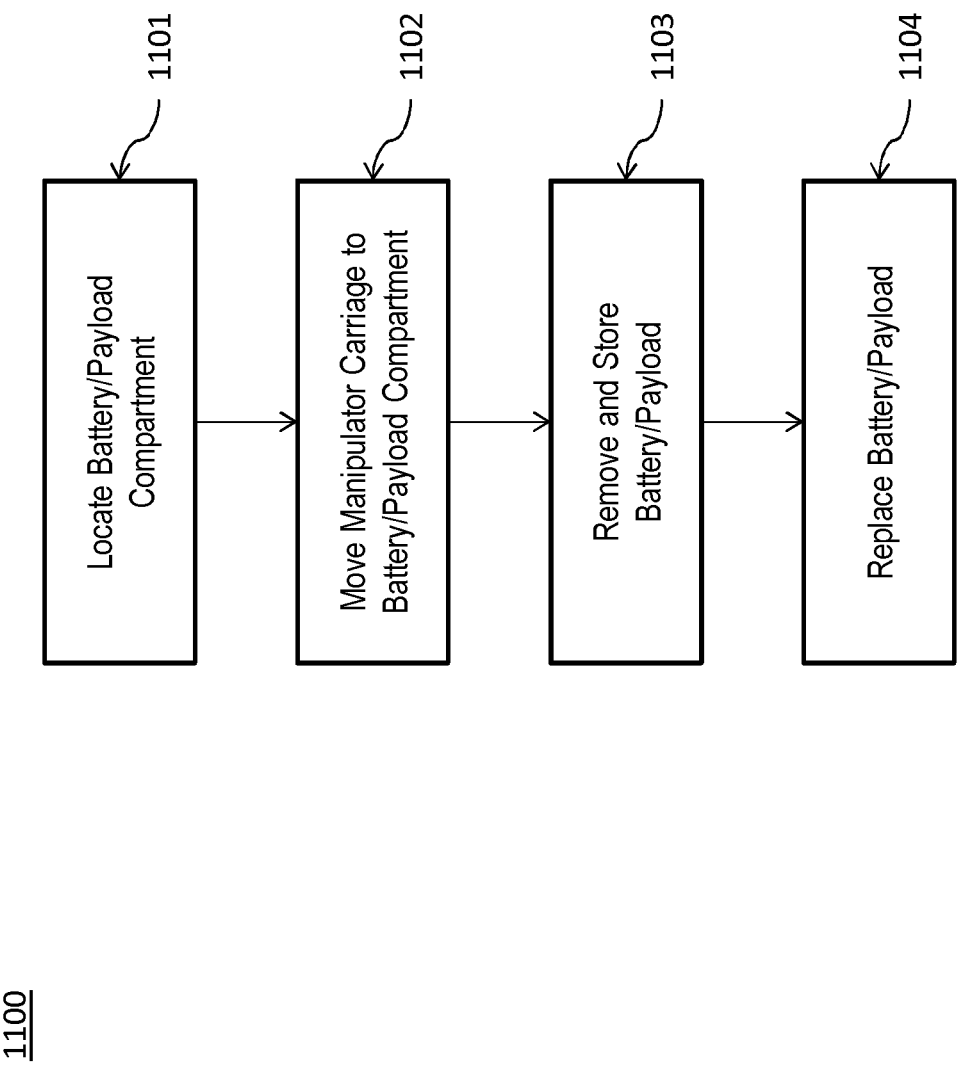
FIG. 11 is an exemplary flowchart illustrating one embodiment of a method of battery or payload exchange using the mobile platform management system of FIG. 1.

Turning to FIG. 11, the exemplary process 1100 for payload and battery maintenance is shown. At 1101, the battery/payload compartment of the mobile platform 200 is located, and the manipulator carriage 312 moves to the located position at 1102. As discussed above, the battery/payload is removed and stored at 1103 in the resource storage 340, for example, to recharge. In another example, a selected UAV 201 suited for agriculture can exchange a spray tank including pesticides with a full tank of pesticides for a subsequent flight task. Once removed, a replacement battery/payload optionally can be returned to the UAV 201, at 1104.

In the preceding examples, a physical payload/battery is exchanged with the base station 300. Additionally and/or alternatively, the base station 300 can be configured for providing non-physical exchange/communication with the mobile platform 200.

Figure 12:
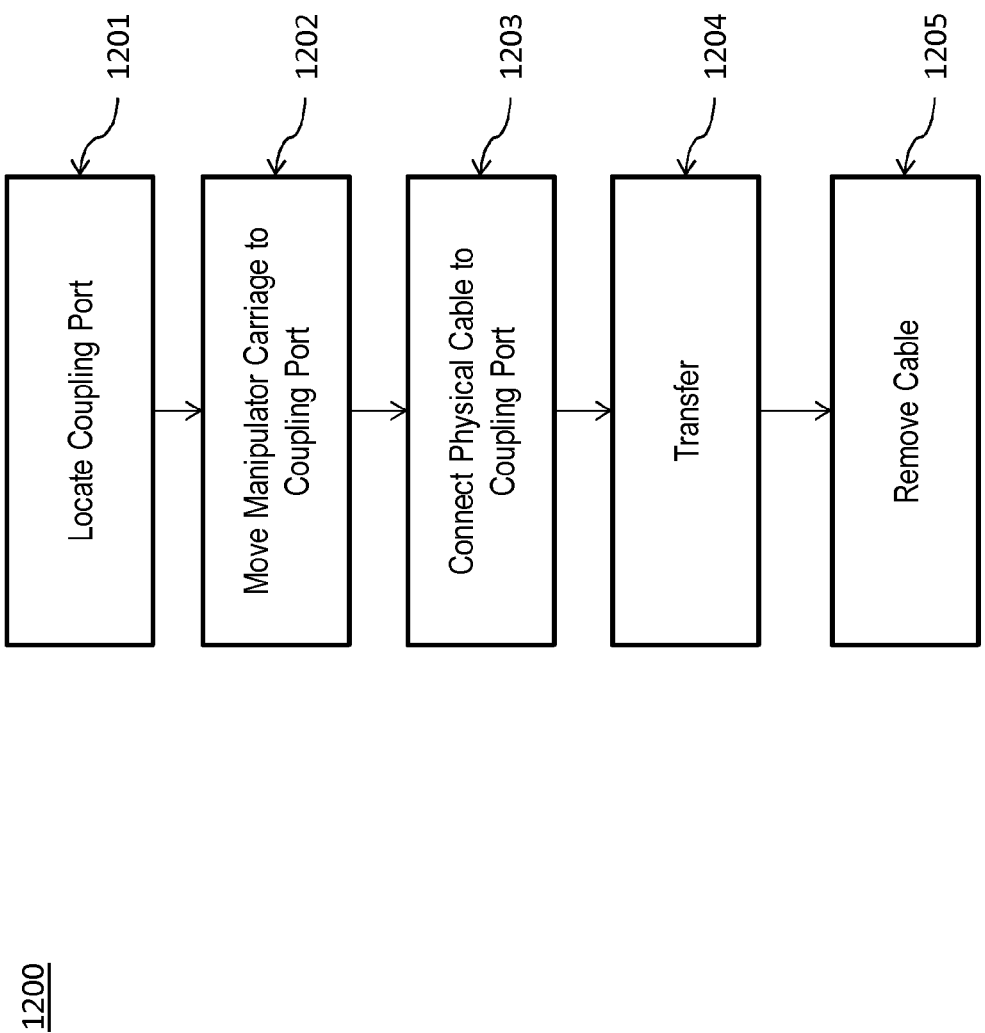
FIG. 12 is an exemplary flowchart illustrating one embodiment of a method of coupling a physical cable using the mobile platform management system of FIG. 1.

With reference now to FIG. 12, for example, the exemplary process 1200 for coupling a physical cable to the mobile platform 200 is shown.

The process 1200 begins, at 1201, with locating a coupling port on the mobile platform 200. For instance, a UAV 201 that is assigned for virtual sightseeing and/or capturing various videos/images can include an on-board data storage system (not shown) with the captured videos/images. Similarly, data can be provided from the base station 300 to the UAV 201 for software/firmware updates. Accordingly, at 1201, the base station 300 locates a data exchange port (e.g., Universal Serial Bus (USB), Ethernet, and so on) on the UAV 201 for providing bidirectional data transfer between the base station 300 and the mobile platform 200. In other examples, the coupling port can include fuel lines, for UAVs 201 that include an engine that can require refueling as discussed above, and/or other non-electronic data ports. Once the desired coupling port has been identified, the process 1202 can move the manipulator 310 to the desired coupling port, at 1202, and a physical cable (e.g., Ethernet cable, USB cable, fuel line, power cable, and so on) of the base station 300 is coupled to the mobile platform 200, at 1203. Data/fuel and the like thereby can be exchanged between the base station 300 and the mobile platform 200, at 1204, and, once the exchange is complete, the physical cable is removed and returned to the home position, at 1205.

In some embodiments, the base station 300 can be configured for providing power, such as electrical operating power, to the mobile platform 200. In process 1200, a physical communication cable, such as an alternating current (AC) adapter, can be used to transfer power from a power source (e.g., resource storage 340) of the base station 300 to the mobile platform 200. Thereby, the base station 300 advantageously can recharge a rechargeable battery (not shown) of the mobile platform 200 without a need to physically remove the battery and/or exchange batteries (e.g., process 1100).

In other embodiments, the base station 300 can be configured for supporting wireless power and/or wireless energy exchange with the mobile platform 200. The base station 300, for example, can be equipped with an electric coil system (not shown) for acting as a power transmitter. Stated somewhat differently, the landing surface 330 of the base station 300 can function as a charging pad for the mobile platform 200. Additionally and/or alternatively, the manipulator 310 can be equipped with the coil system. Accordingly, power can be transferred from the base station 300 to the mobile platform 200 via coupled inductors (e.g., direct induction followed by resonant magnetic induction). Similarly, electromagnetic radiation, electrical conduction, and so on can be used for wireless power transmission between the base station 300 and the mobile platform 200.

In some other embodiments, the base station 300 is configured for tasks that do not involve physical or non-physical exchange with the mobile platform 200. As a non-limiting example, the base station 300 locates a power switch (not shown) on a selected UAV 201. The base station 300 can actuate (e.g., turn on or off) the power switch on the UAV 201 to restart, power-on, power-down, and/or enter a dormant mode.

In yet another embodiment, the landing surface 330 includes a plurality of landing guides (not shown), such as receiving cavities for guiding landing equipment of the mobile platform 200 (shown in FIG. 1). The receiving cavities can facilitate landing and ensure that the mobile platform 200 is in a proper orientation. For example, while the base station 300 may know the predetermined location of particular service areas on a selected UAV 201 as discussed above, the receiving cavities can be used to confirm that the selected UAV 201 did not land at an angle relative to the manipulator compartment 320 that requires additional movement of the manipulator carriage 312. The number of receiving cavities of the landing surface 330 (shown in FIGS. 2-7) can vary to accommodate the UAVs 201 having a predetermined number of landing legs (not shown). When the UAV 201 lands on the landing surface such that the landing legs of the UAV 201 are not received by a respective receiving cavity (not shown), a sensor (not shown) can obtain a spatial relationship between the landing legs of the UAV 201 and corresponding receiving cavities. Thus, the manipulator 310 is configured to assist the UAV 201 into the corresponding cavities based on the obtained spatial relationship. Advantageously, maintenance of the UAV 201 can proceed as discussed above with UAVs 201 having limited landing accuracy.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of managing a payload of a mobile platform positioned on a landing surface, comprising:
    ascertaining a location of the mobile platform after landing on the landing surface;
    moving a mechanical manipulator of a maintenance system to the mobile platform based on the ascertained location of the mobile platform;
    interacting with a selected replacement payload for the mobile platform at the ascertained location of the mobile platform via the mechanical manipulator of the maintenance system; and
    actuating a power switch of the mobile platform using the mechanical manipulator,
    wherein said interacting occurs automatically and without user interaction.

2. The method of claim 1, wherein said moving the mechanical manipulator comprises:
    moving the mechanical manipulator translationally along an X-axis, a Y-axis, a Z-axis, or a combination thereof;
    moving the mechanical manipulator rotationally to the mobile platform based on the ascertained location of the mobile platform; or
    a combination thereof.

3. The method of claim 1, further comprising connecting a physical cable assembly to the mobile platform using the mechanical manipulator, wherein said connecting the physical cable assembly comprises:
    connecting a data communication cable assembly for exchanging data between the base station and the mobile platform;
    connecting a power cable for providing electrical power from the base station to the mobile platform;
    connecting a fuel line for refueling the mobile platform from the base station; or
    a combination thereof.

4. The method of claim 1, wherein said ascertaining the location of the mobile platform comprises receiving position information from one or more sensors comprising an optical sensor, a contact image sensor, an electro-optical sensor, an infra-red sensor, a kinetic inductance detector, a light-emitting diode (LED) as light sensor, a fiber optic sensor, an optical position sensor, a photodetector, a pressure sensor, a photoresistor, a phototransistor, a thermal sensor, a temperature sensor, a proximity sensor, an electric current sensor, a magnetic sensor, a radio sensor, or a combination thereof.

5. The method of claim 1, wherein the mobile platform remains stationary on the landing surface.

6. The method of claim 1, further comprising moving the mobile platform from the ascertained location to a predetermined location on the landing surface resulting in one or more landing legs of the mobile platform each engaging a corresponding receiving cavity defined on a predetermined surface of the landing surface.

7. The method of claim 1, wherein the mobile platform is an unmanned aerial vehicle (UAV).

8. A base station for a mobile platform having a payload, comprising:
    a landing surface configured for the mobile platform to land thereon; and
    a maintenance system comprising:
        a sensor apparatus for ascertaining a location of the mobile platform after landing on the landing surface;
        a resource supply for defining a plurality of resource-slots each configured to removably hold a replacement payload; and
        one or more mechanical manipulators for moving to the ascertained location of the mobile platform, interacting with a selected replacement payload, the payload, or a combination thereof, and actuating a power switch of the mobile platform,
    wherein the mobile platform remains stationary on the landing surface.

9. The base station of claim 8, wherein the mechanical manipulators are operable to:
    move along an X-axis and Y-axis to the selected replacement payload positioned in a selected resource-slot;
    extend a resource-carriage along a Z-axis;
    grasp the selected replacement payload via said resource-carriage;
    retract said resource-carriage along the Z-axis to remove the replacement payload from the resource-slot;
    move the removed replacement payload proximate to the ascertained location of the mobile platform;

insert the replacement payload into a mobile platform resource-slot provided on the mobile platform; and decouple from the replacement payload.

10. The base station of claim 8, wherein said sensor apparatus comprises first and second optical sensors respectively located on first and second location arms of the maintenance system, each of said first and second location arms is extending perpendicularly to a respective axis, said first and second optical sensors being operable to respectively locate the mobile platform along respective perpendicular axes, and wherein the sensor apparatus is configured to operate automatically and without user interaction.

11. The base station of claim 8, wherein the payload or the replacement payload comprises a battery, a data storage unit, a predetermined quantity of fuel, a predetermined quantity of fertilizer, a predetermined quantity of water, a parcel, cargo, a predetermined quantity of pesticides, or a combination thereof.

12. The base station of claim 8, wherein said landing surface comprises a charging pad for wirelessly providing power to the mobile platform.

13. The base station of claim 8, wherein the maintenance system is configured to maintain the mobile platform automatically and without user interaction.

14. The base station of claim 8, wherein at least one of said resource-slots is operable to receive a battery of the mobile platform to charge the received battery.

15. The base station of claim 8, wherein said mechanical manipulators are operable to assist the mobile platform in a landing cavity on the landing surface to orient the mobile platform.

16. The base station of claim 8, wherein the maintenance system is further operable to ascertain a distance between the mobile platform and a second base station located on a travel path of the mobile platform.

17. The base station of claim 16, wherein the maintenance system is further operable to provide a signal to the mobile platform, the signal instructing the mobile platform to land on the landing surface or to travel to the second base station.

18. The base station of claim 8, wherein the mobile platform is an unmanned aerial vehicle (UAV).

19. A maintenance system of a base station for a mobile platform having a payload, comprising:
a sensor apparatus for ascertaining a location of the mobile platform after landing on a landing surface;
a resource supply for defining a plurality of resource-slots each configured to removably hold a replacement payload; and
one or more mechanical manipulators for moving to the mobile platform based on the ascertained location of the mobile platform on the landing surface and interacting with a selected replacement payload, the payload, or a combination thereof,
wherein the mobile platform remains stationary on the landing surface, and
wherein said mechanical manipulators are operable to actuate a power switch of the mobile platform.

20. The maintenance system of claim 19, wherein said maintenance system is operable to move translationally along an X-axis, a Y-axis, a Z-axis or a combination thereof, to move rotationally to the ascertained location of the mobile platform, or a combination thereof.

21. The maintenance system of claim 19, wherein said sensor apparatus comprises first and second optical sensors operable to respectively locate the mobile platform along respective perpendicular axes, and wherein the sensor apparatus is configured to operate automatically and without user interaction.

22. The maintenance system of claim 19, wherein said mechanical manipulators are operable to connect a physical cable assembly to the mobile platform or wirelessly provide power to the mobile platform.

23. A method of managing a payload of a mobile platform, comprising:
determining a first distance between the mobile platform and a first base station;
determining a second distance between the mobile platform and a second base station;
signaling to the mobile platform to land on a selected the first or second base station based on the determined first and second distances;
landing the mobile platform on a landing surface of the selected base station;
ascertaining a location of the mobile platform on the landing surface; and
moving a mechanical manipulator of a maintenance system to the ascertained location of the mobile platform.

24. The method of claim 23, wherein said moving the mechanical manipulator comprises:
moving the mechanical manipulator translationally along an X-axis, a Y-axis, a Z-axis, or a combination thereof;
moving the mechanical manipulator rotationally to the mobile platform based on the ascertained location of the mobile platform;
or a combination thereof.

25. The method of claim 23, further comprising interacting with a selected payload of the mobile platform via the maintenance system, wherein said interacting occurs automatically and without user interaction.

26. The method of claim 1, further comprising guiding a landing orientation of the mobile platform onto the landing surface using a receiving cavity defined on the landing surface.

27. The method of claim 26, wherein said guiding comprises guiding the landing orientation of the mobile platform by receiving a landing leg on the mobile platform into the receiving cavity.

28. A method of managing a payload of a mobile platform positioned on a landing surface, comprising:
ascertaining a location of the mobile platform after landing on the landing surface;
moving a mechanical manipulator of a maintenance system to the mobile platform based on the ascertained location of the mobile platform;
identifying a service marker on the mobile platform indicative of the position of the payload; and
interacting with a selected payload based on a location of the service marker.

29. The method of claim 1, wherein said moving the mechanical manipulator comprises moving the mechanical manipulator along a rail system.

* * * * *